March 29, 1927.
A. BRIGDEN
CULTIVATOR
Filed June 25, 1926
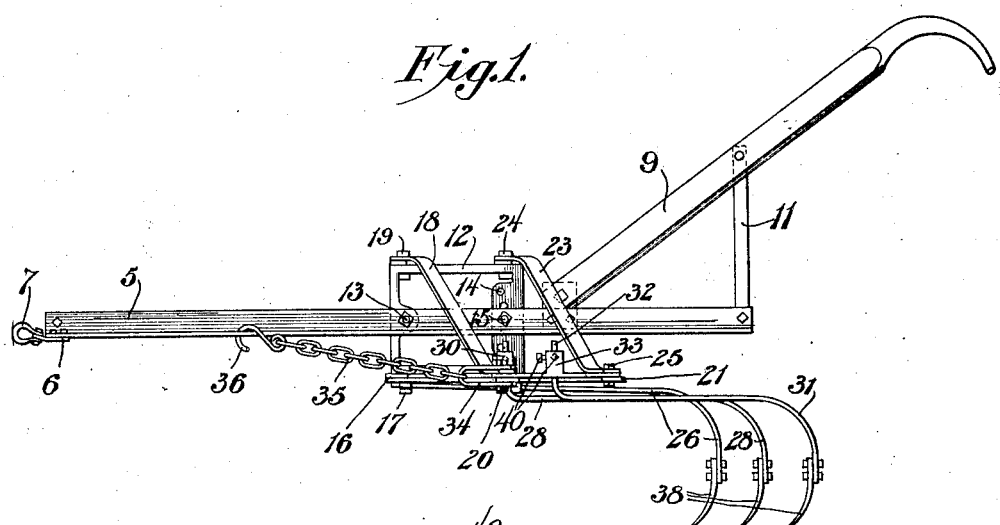
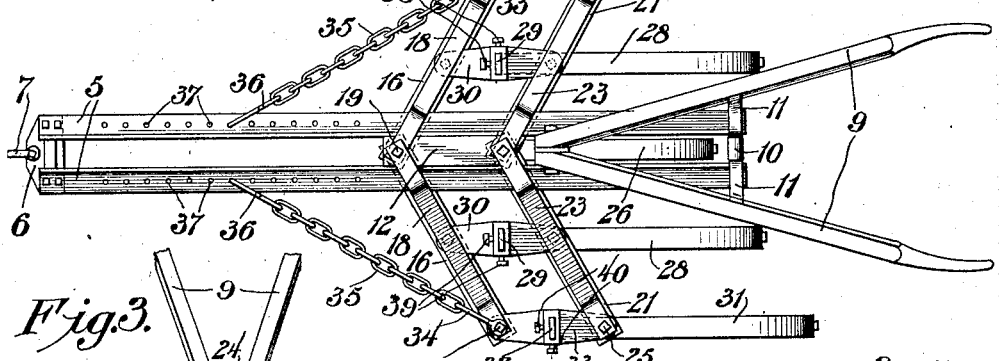
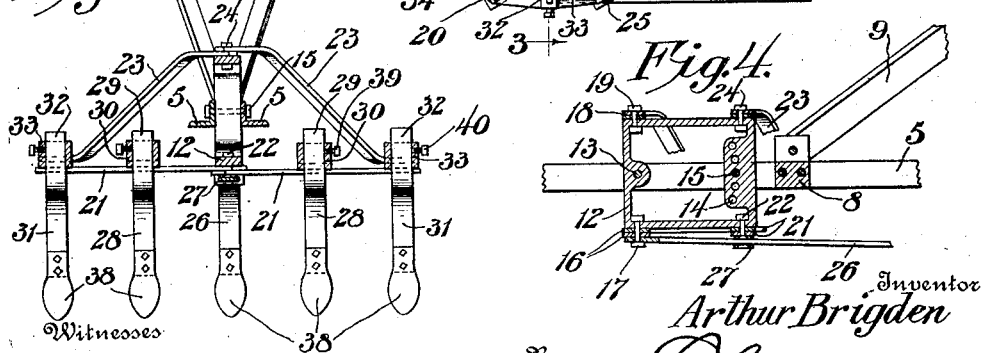
Inventor
Arthur Brigden Patented Mar. 29, 1927.

1,622,488

UNITED STATES PATENT OFFICE.

ARTHUR BRIGDEN, OF TUSCALOOSA, ALABAMA.

CULTIVATOR.

Application filed June 25, 1926. Serial No. 118,542.

This invention relates to cultivators, and has for its object to provide certain new and improved adjustable features which adapt the same for use under various conditions, and in connection with various crops at different stages of growth.

The specific construction of the invention and the advantages resulting therefrom will be more particularly explained in the following detailed description taken in connection with the accompanying drawing, which illustrates the same in its preferred form.

In the drawing:

Figure 1 is a side elevation of the invention.

Figure 2 is a plan view thereof.

Figure 3 is a transverse section taken on the line 3—3 of Figure 2.

Figure 4 is a vertical longitudinal section through the central portion of the invention.

The cultivator, constituting the subject matter of the invention, comprises a main beam made up of two spaced rails 5, preferably in the form of angle bars, and connected at their front ends to a header 6, to which a clevis 7 is connected. The rear portions of the bars 5 are held in spaced relation by a spacer 8, to which the lower ends of the handle bars 9 are secured and by a spacer 10, which is connected by braces 11 to the handle bars.

A block 12 is mounted between the bars 5 on a pivot bolt 13 passing through the front portion of the block, and the rear portion of the block is provided with an arcuate series of holes 14, any one of which is adapted to receive a bolt 15, whereby the block may be adjustably secured. A pair of spreader bars 16 are connected at their inner ends to the lower front corner of the block 12 by a bolt 17, and normally extend outwardly and rearwardly therefrom. A pair of brace bars 18 are connected at their inner ends by a bolt 19 to the upper front corner of the block 12, and are connected at their outer ends by bolts 20 to the outer ends of the spreader bars 16. A pair of rear spreader bars 21 are connected at their inner ends by a bolt 22 to the lower rear corner of the block 12, and extend outwardly in parallel relation to the bars 16. A pair of brace bars 23 are connected at their inner ends by a bolt 24 to the upper rear corner of the block 12, and are connected at their outer ends by bolts 25 to the outer ends of the bars 21.

A middle tooth supporting arm 26 is connected at its front end to the bolt 17, and passes through a keeper 27 secured to the bolt 22. A pair of tooth supporting arms 28 are arranged at opposite sides of the arm 26, and each is turned upwardly at its front end, as shown at 29, and is secured by set screws 39 in a bearing and spacing block 30, which connects the intermediate portions of the spreader arms 16 and 21, one set screw bearing against the flat side of the upturned portion and the other bearing against the edge thereof. The outermost tooth supporting arms 31 are supported at the outer ends of the spreader arms, each having an upturned end portion 32, which is similarly secured by set screws 40 in a bearing and spacing block 33, connected to the outer ends of the spreader arms.

The spreader arms 16 and 21 are adjustable about the bolts 17 and 22 as pivots, and are held in spaced parallel relation by the blocks 30 and 33. A swivel 34 is connected to each of the bolts 20, and a chain 35, or other suitable connecting element, is connected to the swivel, and has a hook 36 at its front end which may be engaged with any one of a series of holes 37 formed in the bar 5, whereby to adjustably limit the position of the spreader arms as the cultivator is drawn over the ground. Each of the arms 26, 28 and 31 has a tooth 38 connected to its rear end. These teeth may be connected, as shown in Figure 1, so as to point forwardly for deep plowing, or they may be reversed so as to act as drag teeth.

From the foregoing description, it will be understood that the block 12 may be adjusted up or down about the bolt 13 to change the pitch of the teeth 38 for deep or shallow plowing. The tooth supporting arms 28 and 31 are individually adjustable vertically in the respective bearing blocks 30 and 33, and in cultivating small or young plants, the cultivator is adapted to straddle the row, and the outer teeth may be adjusted downwardly. When the plants are large, the cultivator is adapted to be drawn between the rows, and the outer teeth adjusted upwardly. In cultivating plants whose lateral roots have run out between the rows, the positions of the teeth 38 are reversed to form drag teeth, so as to not injure the roots. In any case, the block 12 may be adjusted for plowing at the depth desired. The connections of the elements 35 with the bars 5 may, of course, be adjusted, so that the width of the cultivator will correspond to the width of the rows. The resistance of the teeth in the ground will, of course, keep the chains 35 taut at all times.

While I have herein shown and described the detailed construction of the invention in what is at present its preferred form, it is to be understood that various modifications may be made therein without any material departure from the salient features of the invention as embodied in the claims.

What is claimed is:

1. In a cultivator, the combination of a beam, a block mounted on the beam, spreader bars supported by said block, arms supported by the block and the spreader bars respectively, and depending teeth secured to the arms, said block being angularly adjustable in a vertical plane to vary the pitch of said teeth.

2. In a cultivator, the combination of a beam including two parallel spaced sections, a pivot bolt traversing the space between said sections, a block mounted on said bolt and angularly adjustable about the same as an axis, spreader bars supported by said block, arms supported by the block and the spreader bars respectively, and depending earth engaging teeth secured to the arms.

3. In a cultivator, the combination of a beam, a block mounted on the beam, spreader bars supported by said block, a middle tooth supporting arm secured directly to the block, other tooth supporting arms supported from the spreader bars, and ground engaging teeth carried by said arms, said block being angularly adjustable in a vertical plane to vary the pitch of said teeth.

4. In a cultivator, the combination of a beam, a block mounted on the beam, front and rear spreader bars supported by said block, a middle tooth supporting arm secured directly to the block, spacing members connecting the front spreader bars to the rear spreader bars, other tooth supporting arms supported for bodily vertical adjustment with respect to said spacing members, and ground engaging teeth carried by said arms, said block being angularly adjustable in a vertical plane to vary the pitch of said teeth.

5. In a cultivator, the combination of a beam including two parallel spaced sections, a pivot member traversing the space between said sections, a block mounted on said member and angularly adjustable about the same as an axis, spreader bars supported by said block, a middle tooth supporting arm secured directly to the bottom of the block, laterally disposed arms supported from the spreader bars, and ground engaging teeth secured to the respective arms.

6. In a cultivator, the combination of a beam including two parallel spaced sections, a pivot bolt traversing the space between said sections, a block mounted on said bolt and between said sections, front and rear spreader bars supported by said block and normally extending laterally and rearwardly therefrom, a middle tooth supporting arm secured directly to the bottom of the block, spacing members connecting the front spreader bars to the rear spreader bars and maintaining them in spaced parallel relation, other tooth supporting arms supported for bodily vertical adjustment with respect to said spacing members, and ground engaging teeth carried by the respective arms, said block being angularly adjustable in a vertical plane about said pivot bolt as an axis to vary the pitch of said teeth.

In testimony that I claim the foregoing as my own, I have hereto affixed my signature.

ARTHUR BRIGDEN.